(12) United States Patent
Okuda et al.

(10) Patent No.: US 12,174,022 B2
(45) Date of Patent: Dec. 24, 2024

(54) APPARATUS AND METHOD FOR ROUTE EDITING ASSISTANCE

(71) Applicant: Furuno Electric Co., Ltd., Nishinomiya (JP)

(72) Inventors: Masato Okuda, Kyoto (JP); Tomoko Fujimoto, Kobe (JP); Timo Kostiainen, Espoo (FI); Antti Kuukka, Espoo (FI)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 209 days.

(21) Appl. No.: 17/737,043

(22) Filed: May 5, 2022

(65) Prior Publication Data
US 2022/0357160 A1    Nov. 10, 2022

(30) Foreign Application Priority Data

May 6, 2021    (EP) .................................. 21172605.4

(51) Int. Cl.
*G01C 21/20* (2006.01)
*G01C 21/00* (2006.01)
*G06F 3/0484* (2022.01)

(52) U.S. Cl.
CPC .......... *G01C 21/203* (2013.01); *G01C 21/005* (2013.01); *G06F 3/0484* (2013.01)

(58) Field of Classification Search
CPC ... G01C 21/203; G01C 21/005; G06N 3/0484
See application file for complete search history.

(56) References Cited

U.S. PATENT DOCUMENTS

| 9,046,591 B1* | 6/2015 | Yang ..................... G01C 21/005 |
| 11,691,703 B2* | 7/2023 | Grunewald Mayer .. G08G 3/02 701/21 |
| 2008/0133131 A1* | 6/2008 | Poreda ..................... G08G 3/02 701/418 |
| 2014/0108161 A1* | 4/2014 | Cubillo .............. G01C 21/3644 705/14.69 |

(Continued)

FOREIGN PATENT DOCUMENTS

EP    2594900 A1    5/2013

OTHER PUBLICATIONS

Laffey ("How to add a stop on Google Maps before your final destination, on desktop or mobile", published: Nov. 27, 2019, businessinsider.com, https://www.businessinsider.com/guides/tech/how-to-add-a-stop-on-google-maps) (Year: 2019).*

(Continued)

*Primary Examiner* — Seth A Silverman
(74) *Attorney, Agent, or Firm* — XSENSUS LLP

(57) ABSTRACT

A route editing assistance device for editing a first route is provided. The route editing assistance device includes an input interface, and processing circuitry. The input interface is configured to accept position information indicating positions of a first set of waypoints representing the first route. The processing circuitry is configured to accept position information indicating positions of a second set of waypoints, wherein the second set of waypoints defines a second route, and generate display data for simultaneously displaying the first route and the second route on a display.

12 Claims, 9 Drawing Sheets

(56) References Cited

U.S. PATENT DOCUMENTS

2017/0370724 A1* 12/2017 Hovland .............. G01C 21/203
2020/0097303 A1* 3/2020 O'Kane ............ G06F 16/24575

OTHER PUBLICATIONS

Extended European Search Report mailed on Jan. 18, 2022, received for EP Application 21172605.4, 12 pages.
Office Action issued on Oct. 25, 2024, in corresponding European patent Application No. 21172605.4, 8 pages.
SIMRAD, "SIMRAD CS68 ECDIS Operator Manual", Jan. 1, 2014, total 151 pages.

* cited by examiner

Waypoints Route 3 — 405

| Name | Position | RAD NM | XTD m | Margin m | PL GC/RL | Leg course | Leg NM | Total NM | MIN Speed kn | MAX Speed kn | Draft m | ETD/ETA (UTC) | Time zone | DST |
|---|---|---|---|---|---|---|---|---|---|---|---|---|---|---|
| 1 | 02°26.604'N 001°17.516E | | 10 | 50 | RL | 073.4° | 102.0 | 0.0 | 4.0 | 25.0 | 5.0 | | ±00:00 | |
| 2 | 02°55.857'N 002°55.354'E | 0.80 | 10 | 50 | RL | 090.1° | 109.4 | 102.0 | 4.0 | 25.0 | 5.0 | | ±00:00 | |
| 3 | 02°55.579'N 004°44.607'E | 0.80 | 10 | 50 | RL | 098.3° | 132.6 | 211.4 | 4.0 | 25.0 | 5.0 | | ±00:00 | |
| 4 | 02°36.355'N 006°55.877'E | 0.80 | 10 | 50 | RL | 119.9° | 75.8 | 344.0 | 4.0 | 25.0 | 5.0 | | +01:00 | |
| 5 | 01°58.471'N 008°01.381'E | 0.80 | | | | | | 419.8 | | | | | | |

Waypoints Route 3 — 407

| Name | Position | RAD NM | XTD m | Margin m | PL GC/RL | Leg course | Leg NM | Total NM | MIN Speed kn | MAX Speed kn | Draft m | ETD/ETA (UTC) | Time zone | DST Check |
|---|---|---|---|---|---|---|---|---|---|---|---|---|---|---|
| 1 | 02°26.604'N 001°17.516E | | 10 | 50 | RL | 114.6° | 107.6 | 0.0 | 4.0 | 25.0 | 5.0 | | ±00:00 | |
| 2 | 01°41.478'N 002°55.322'E | 0.80 | 10 | 50 | RL | 100.5° | 97.1 | 107.6 | 4.0 | 25.0 | 5.0 | | ±00:00 | |
| 3 | 01°23.647'N 004°30.652'E | 0.80 | 10 | 50 | RL | 086.3° | 106.9 | 204.7 | 4.0 | 25.0 | 5.0 | | ±00:00 | |
| 4 | 01°30.612'N 006°17.131'E | 0.80 | 10 | 50 | RL | 075.1° | 108.1 | 311.6 | 4.0 | 25.0 | 5.0 | | +01:00 | |
| 5 | 01°58.471'N 008°01.381'E | 0.80 | | | | | | 419.7 | | | | | | |

1:2,092,247+ | North TM | TM Reset | Center (off) | Vector T GND | Own ship | 6 min | Chart | Doc | Weather | Radar Overlay | Tragets

FIG. 4

APPARATUS AND METHOD FOR ROUTE EDITING ASSISTANCE

CROSS-REFERENCE TO RELATED APPLICATION

This application claims priority under 35 U.S.C. § 119 to European Patent Application No. 21172605.4, which was filed on May 6, 2021, the entire disclosure of which is hereby incorporated by reference.

TECHNICAL FIELD

An example embodiment of the present disclosure generally relates to a route editing assistance device for editing a navigation route.

BACKGROUND

Vessels (for example ships, submarines, boats, or the likes) are required to carry nautical charts and nautical publications to plan and display the vessel's navigation route on a display, for intended navigation. Therefore, the vessels are equipped with information systems such as an Electronic Chart Display and Information System (ECDIS). The ECDIS displays a chart of a desired sea area by performing software processing of electronic chart data. The ECDIS may be configured to display the navigation route for route monitoring while the vessel is navigating on the navigation route. Under certain circumstances, it becomes necessary to edit the navigation route under monitoring during some circumstances. For example, in face of an obstacle in the navigation route under monitoring, it is necessary to deviate from the navigation route to avoid collision.

With advancement in navigation systems, various navigation route editing techniques (for example, instant track technique) have been introduced. Currently, the instant track technique provides a temporary track, consisting of four waypoints, to return to or deviate from the navigation route under monitoring. The instant track technique can create a new route to return to the navigation route when the vessel goes outside channel limits, and/or to temporarily deviate from the navigation route under monitoring in face of the obstacle.

However, the instant track technique has certain limitations such as distance limitation and the like. For example, a destination point must be within 50 miles from the vessel. Additionally, the instant track technique requires several user actions before creating a new route, due to which time lag exists in starting the route editing. Further, the instant track technique doesn't provide display of both the navigation route under monitoring and the newly created route. As a result, the newly created route cannot be compared with the navigation route under monitoring which limits the user to take any further decisions in editing the navigation route.

Accordingly, there is a need of a route editing assistance device that provides an efficient route editing operation.

SUMMARY

In order to solve the foregoing problem, the present disclosure provides a route editing assistance device for editing a first route. The route editing assistance device comprises an input interface and processing circuitry. The input interface is configured to accept position information indicating positions of a first set of waypoints representing the first route. The processing circuitry is configured to accept position information indicating positions of a second set of waypoints, wherein the second set of waypoints defines a second route, and generate display data for simultaneously displaying the first route and the second route on a display.

According to some example embodiments, the route editing assistance device further comprises a memory, a display, and a touch panel. The memory is configured to store a navigation chart including the first route, the conning information of the first route, the second route, and the conning information of the second route. The display is configured to display the navigation chart. The touch panel is configured to receive at least one of the position information indicating the positions of the first set of waypoints, the position information indicating the positions of the second set of waypoints, the position displace information, the first user input, the one or more user inputs, and the second user input.

According to an example embodiment, a route editing assistance method for editing a first route is provided. The route editing assistance method comprises accepting position information indicating positions of a first set of waypoints representing the first route, accepting position information indicating positions of a second set of waypoints, wherein the second set of waypoints defines a second route, and generating display data for simultaneously displaying the first route and the second route on a display.

According to an example embodiment, non-transitory computer readable medium storing instructions that, when executed by one or more processors, cause a computing device to perform a method for editing a first route. The method comprises accepting position information indicating positions of a first set of waypoints representing the first route, accepting position information indicating positions of a second set of waypoints, wherein the second set of waypoints defines a second route, and generating display data for simultaneously displaying the first route and the second route on a display.

The foregoing summary is illustrative only and is not intended to be in any way limiting. In addition to the illustrative aspects, embodiments, and features described above, further aspects, embodiments, and features will become apparent by reference to the drawings and the following detailed description.

In various embodiments, a device and a method may be provided for editing a navigation route for a vessel or an aircraft. Example embodiments of the present disclosure provide a route editing assistance device that provides an efficient route editing operation. The route editing assistance device requires only a single user action to start editing of the navigation route. Thereby, a time lag in starting the route editing is minimized. Additionally, according to various embodiments, a route of any distance can be edited. In other words, there is no distance limitation for editing the navigation route. Various embodiments enable simultaneous display of an original route and a route obtained after editing, which in turn allows a user to compare the original route and the route obtained after editing for better planning of routes during navigation.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1A:
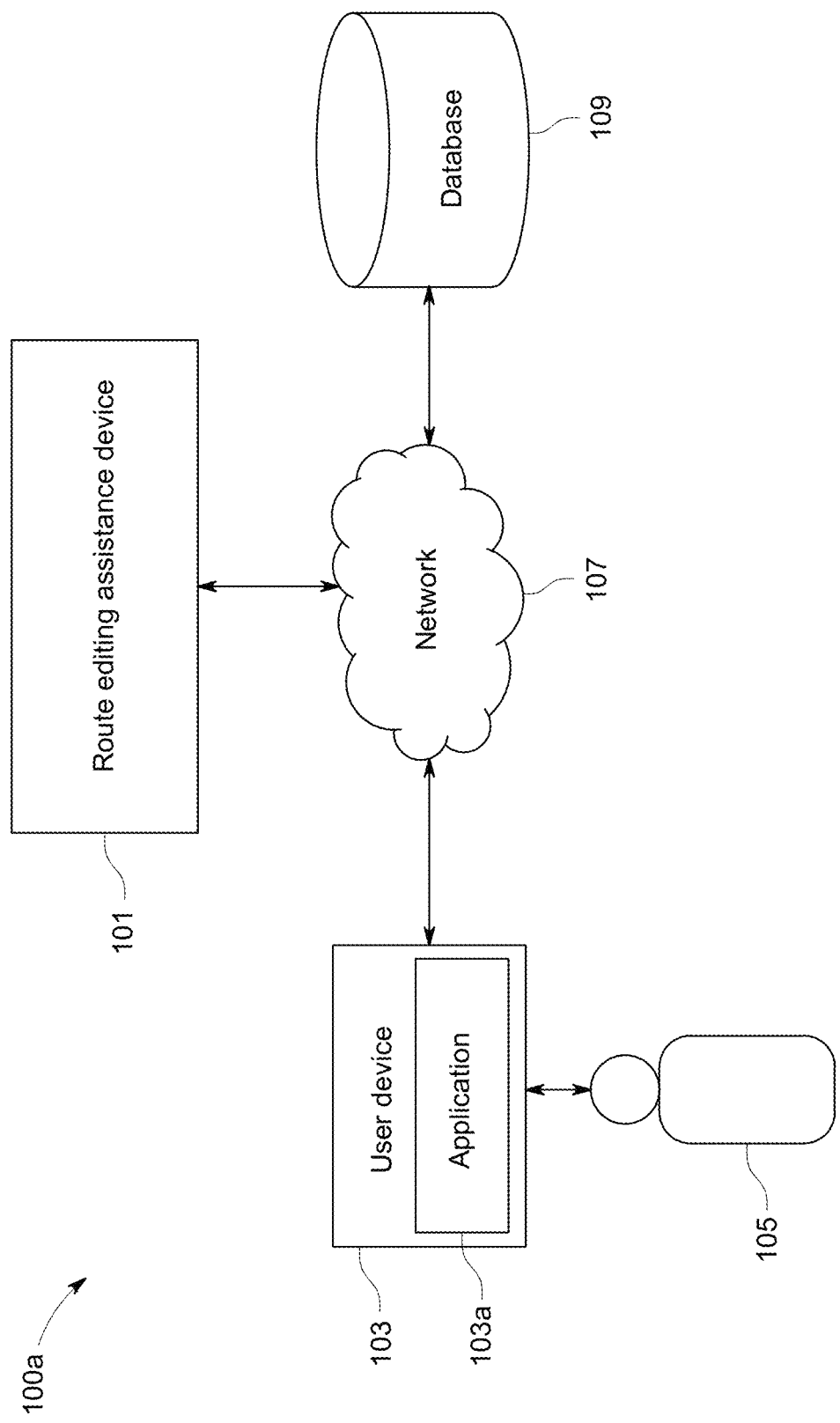
FIG. 1A is a schematic diagram that exemplarily illustrates working environment of a route editing assistance device, in accordance with an example embodiment.

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Further, the terms "processor", "controller" and "processing part" and similar terms may be used interchangeably to refer to the processor capable of processing information in accordance with embodiments of the present disclosure. Further, the terms "electronic equipment", "electronic devices" and "devices" are used interchangeably to refer to electronic equipment monitored by the system in accordance with embodiments of the present disclosure. Thus, use of any such terms should not be taken to limit the spirit and scope of embodiments of the present disclosure.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

As used in this specification and claims, the terms "for example" "for instance" and "such as", and the verbs "comprising," "having," "including" and their other verb forms, when used in conjunction with a listing of one or more components or other items, are each to be construed as open ended, meaning that that the listing is not to be considered as excluding other, additional components or items. Other terms are to be construed using their broadest reasonable meaning unless they are used in a context that requires a different interpretation.

One of the objectives of the present disclosure is to provide an efficient route editing operation. It is also an objective of the present disclosure to simultaneously display a first route and a second route on a display for a navigation route planning device. It is also an objective of the present disclosure is to generate conning information of the first route and conning information of the second route to be displayed on the display. In accordance with various embodiments, the present disclosure proposes a route editing assistance device. The route editing assistance device allows the user to edit the first route to form the second route. The route editing assistance device requires only a single user action to start editing of the first route. Thereby, a time lag in starting the route editing is minimized.

The route editing assistance device is configured to accept positions of a first set of waypoints defining the first route, and positions of a second set of waypoints defining the second route. The route editing assistance device is further configured to generate display data for simultaneously displaying the first route and the second route on a display. The simultaneous display of the first route and the second route allows a user to access original route (i.e., the first route) and edited route (the second route) and to easily compare the navigation path, navigation parameters and course of navigation for the first route and the second route. This in turn allows the user to make better navigation decisions in case an obstacle is encountered on the planned route (such as the first route) of a moving object (such as a vessel in water or an aircraft in sky), and a new route (such as the second route) or segment of route has to be generated. The new route could then be easily generated using the route editing assistance device, by editing the planned route or a segment of the planned route. Further, simultaneously displaying of both the routes allows the user to compare the original route and the edited route. Additionally, the route editing assistance device allows the user to edit a route of any distance. In other words, the user can edit a route without any limitation of the distance.

Further, the route editing assistance device generates conning information of the first route and conning information of the second route to be displayed on the display. The route editing assistance device simultaneously displays, on the display, the first route, the conning information of the first route, the second route, and the conning information of the second route. The simultaneous display of both the routes with respective conning information allows the user to compare the both the routes based on the respective conning information, which includes a plurality of navigation related parameters relevant for the routes, and select one of the first route or the second route for the navigation.

FIG. 1A is a schematic diagram that exemplarily illustrates working environment 100a of a route editing assistance device 101, in accordance with an example embodiment. In an example embodiment, the route editing assistance device 101 is installed in a vessel navigating over a water body. The water body may comprise a sea, an ocean, a river, or the like. In some embodiments, the route editing assistance device 101 may be installed on an aircraft. The route editing assistance device 101 may obtain inputs from a user 105, where the inputs may comprise location of a navigation start point, location of a navigation destination point, position information indicating positions of a first set of waypoints, and position information indicating positions of a second set of waypoints. The location/position information may comprise position data such as longitude or latitude, direction data, GPS coordinates, distance from a point, or the like. The route editing assistance device 101 is communicatively coupled with a user device 103, and a database 109, via a network 107.

The user device 103 comprises an application 103a installed in it, where the application 103a displays different information associated with navigation for the user 105 operating the user device 103. The user device 103 may be any user accessible device such as a smartphone, a portable computer, a display unit, or the like. In an example embodiment, the user device 103 may include Electronic Chart Display and Information System (ECDIS). The user device 103 uses the application 103a to display different navigation information such as sea maps, tidal currents of the sea, or the like on a display screen of the user device 103. In an example embodiment, the user device 103 may be configured with a touch screen display.

Further, the database 109 may store updated navigation maps, latest information about the weather forecast, information about the tidal currents, and nautical charts that may be used by the vessel for navigating in the water body. The database 109 may further comprise information about dangerous locations in the water body such as location of a whirlpool, an obstacle or the like. The database 109 may comprise navigation data such as information on salinity, water temperature and air temperature, atmospheric pressure, and wind (speed, gusts, and direction), geographical location in terms of longitude and latitude of the vessel, or the like. The database 109 may also comprise updated navigation maps, latest information about the weather forecast, or the like that may be used by the vessel.

In alternate embodiments, the database 109 may be embodied as a map database and may represent a compiled navigation database that may be used in or with the user device 103 to provide navigation and/or map-related functions to the user 105. In such a case, the database 109 may be downloaded or stored on the user device 103.

The network 107 may comprise suitable logic, circuitry, and interfaces that may be configured to provide a plurality of network ports and a plurality of communication channels for transmission and reception of data, such as selected positions of the navigation start point, the navigation destination point, or the like. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 107 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 107 may include, but are not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

Some embodiments are based on the recognition that in order to perform efficient route editing, multiple routes should be simultaneously displayed so that a user can compare the routes, edit the routes and opt for a better route.

To that end, the route editing assistance device 101 allows the user 105 to edit a first route comprised of the first set of waypoints. The route editing assistance device 101 is configured to accept the position information indicating positions of the second set of waypoints. The second set of waypoints defines a second route. The route editing assistance device 101 is further configured to generate display data for simultaneously displaying the first route and the second route on a display. Additionally, the route editing assistance device 101 generates conning information of the first route and conning information of the second route to be displayed on the display. A detailed analysis of the proposed route editing assistance device 101 is described below with respect to FIG. 1B.

Figure 1B:
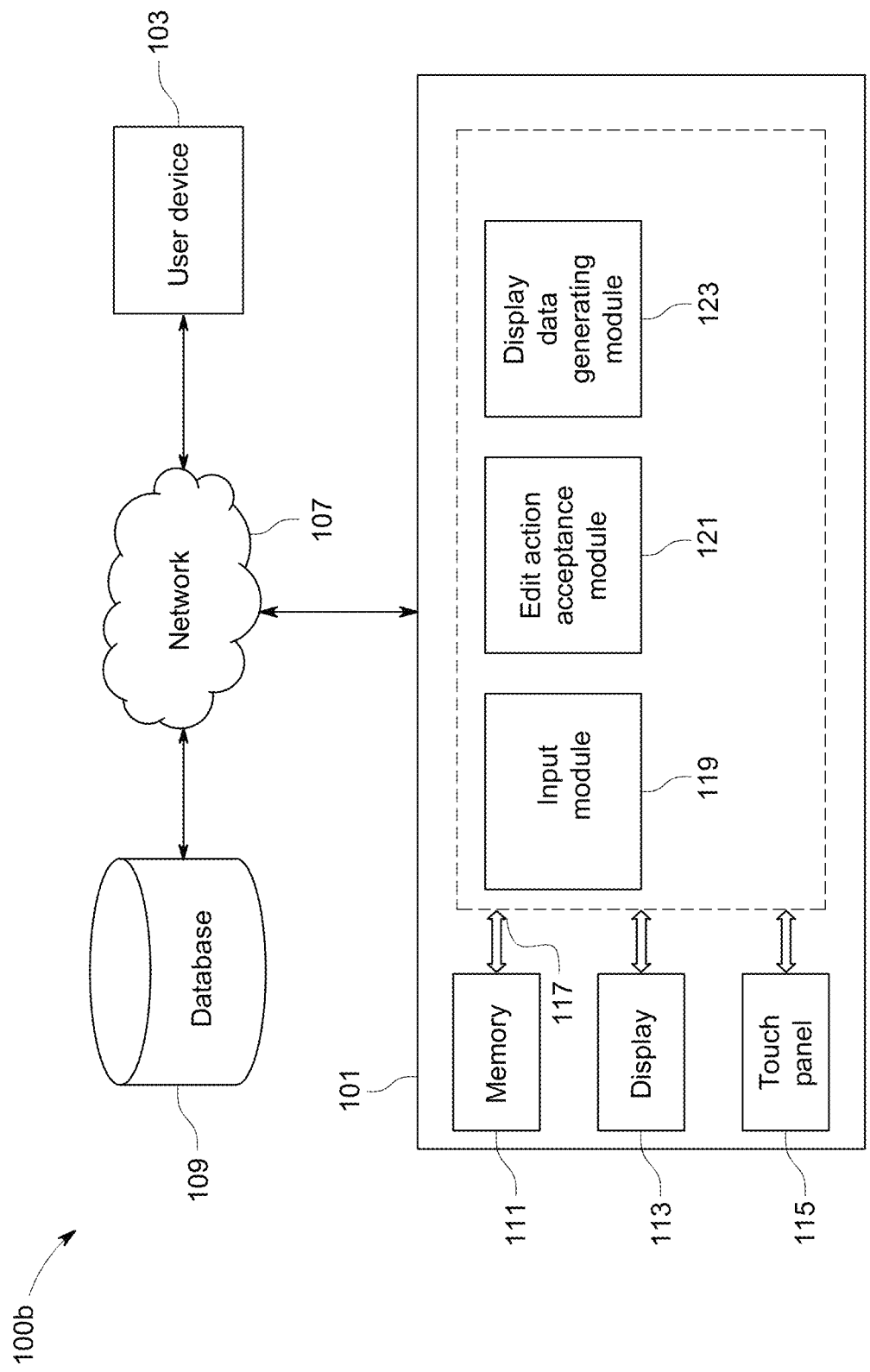
FIG. 1B illustrates a block diagram of the route editing assistance device, exemplarily illustrated in FIG. 1A, in accordance with an example embodiment.

FIG. 1B illustrates a block diagram 100b of the route editing assistance device 101, exemplarily illustrated in FIG. 1A, in accordance with an example embodiment. The route editing assistance device 101 includes a processing circuitry configured to execute stored instructions, as well as a memory 111 that stores instructions that are executable by the processing circuitry. The memory 111 is further configured to store a navigation chart including the first route, the conning information of the first route, the second route, and the conning information of the second route. The memory 111 can include random access memory (RAM), read only memory (ROM), flash memory, or any other suitable memory systems.

In an embodiment, the route editing assistance device 101 includes an input module 119, an edit action acceptance module 121, and a display data generating module 123. The input module 119 is configured to accept the position information indicating positions of the first set of waypoints representing the first route. The edit action acceptance module 121 is configured to accept the position information indicating positions of the second set of waypoints, where the second set of waypoints defines the second route. The display data generating module 123 is configured to generate the display data for simultaneously displaying the first route and the second route. The display data generating module 123 is further configured to generate the conning information of the first route and the conning information of the second route.

Further, the route editing assistance device 101 comprises a display 113. The display 113 is configured to display the navigation chart. The route editing assistance device 101 further comprises a touch panel 115 configured to receive a plurality of user inputs. For example, different position data include such as the position information indicating the positions of the first set of waypoints, the position information indicating the positions of the second set of waypoints, position displace information, and the like. In some embodiments, the display 113 may be a touch screen display panel configured to receive at least one of the position information indicating the positions of the first set of waypoints, the position information indicating the positions of the second set of waypoints, the position displace information, and the like. Additionally or alternatively, the route editing assistance device 101 may also comprise the ECDIS. The memory 111, the display 113, and the touch panel 115 are interconnected with the input module 119, the edit action acceptance module 121, and the display data generating module 123, via a bus 117.

The position information indicating the positions of the first set of waypoints and the position information indicating the positions of the second set of waypoints, may be inputted, by the user 105, on the navigation chart displayed on the display 113 by directly tapping on specific locations or moving a cursor on the display 113, or by inputting longitude and latitude of the first set of waypoints and the second set of waypoints. In another embodiment, the user 105 may operate the user device 103 to remotely input locations of the first set of waypoints and the second set of waypoints on a map displayed on a touch screen of the user device 103, via the network 107.

Figure 2A:
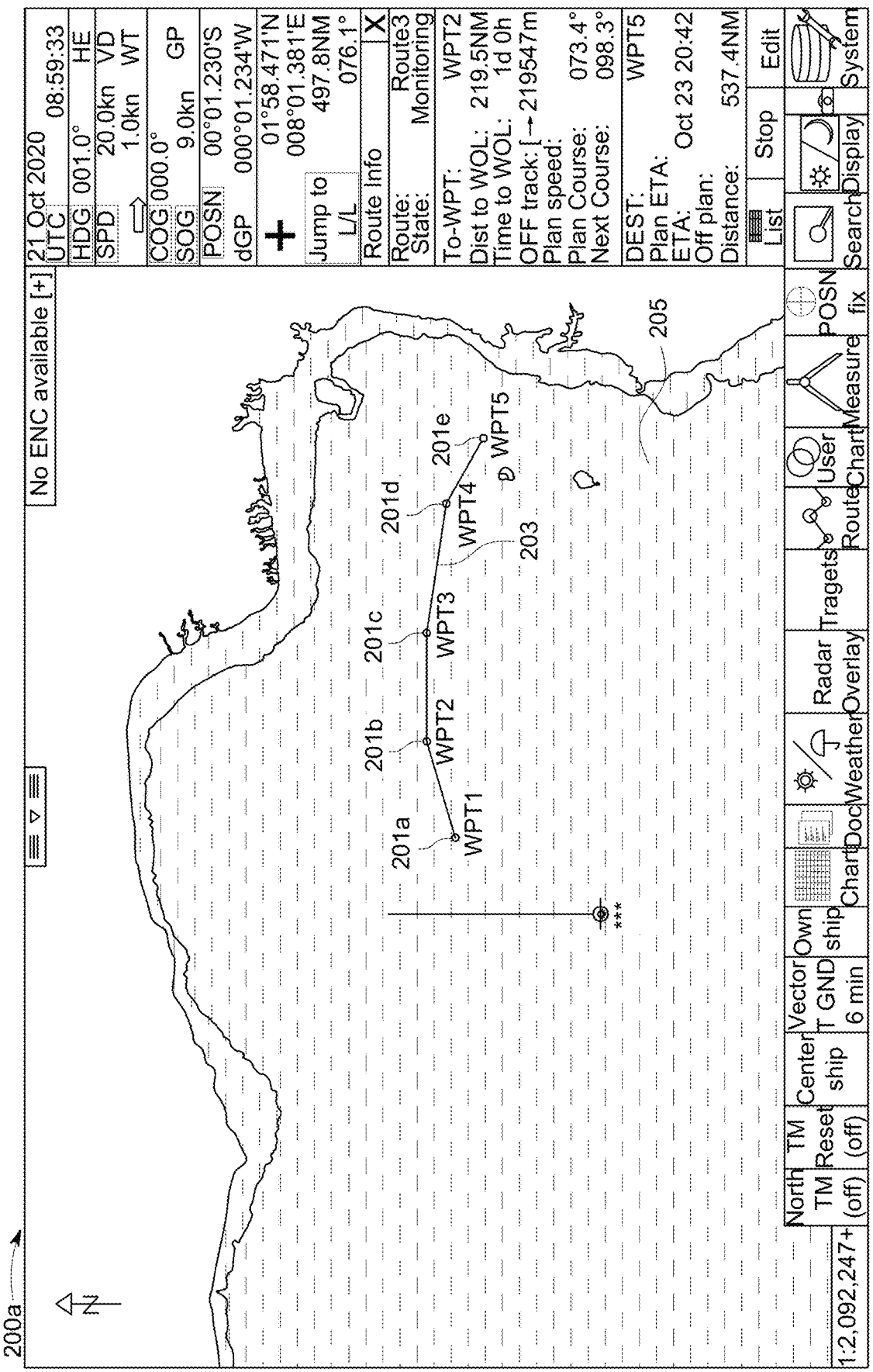
FIG. 2A illustrates a user interface to accept a first set of waypoints which define a first route, in accordance with an example embodiment.
Figure 2B:
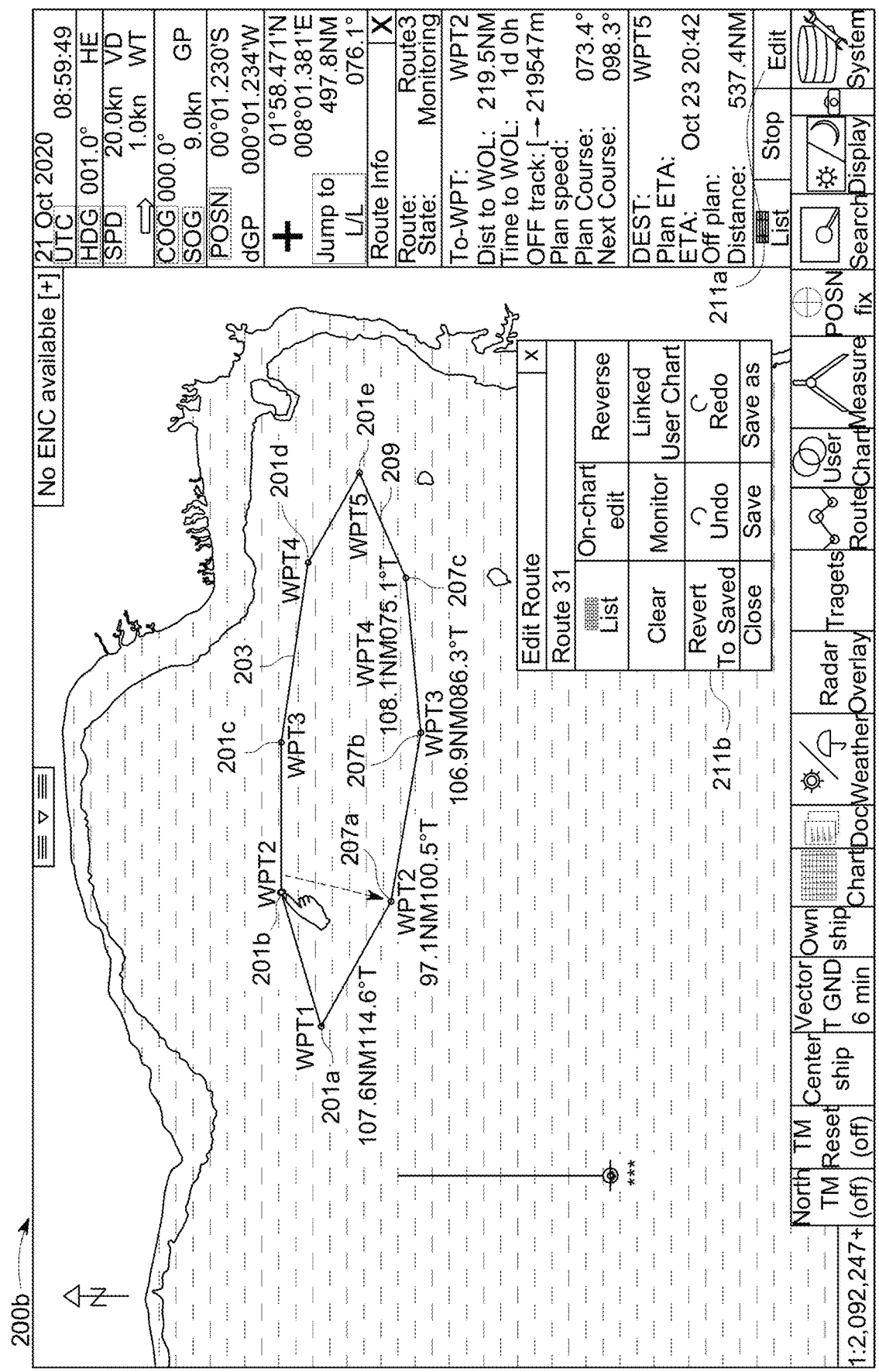
FIG. 2B illustrates a user interface for editing the first route, in accordance with an example embodiment.
Figure 2C:
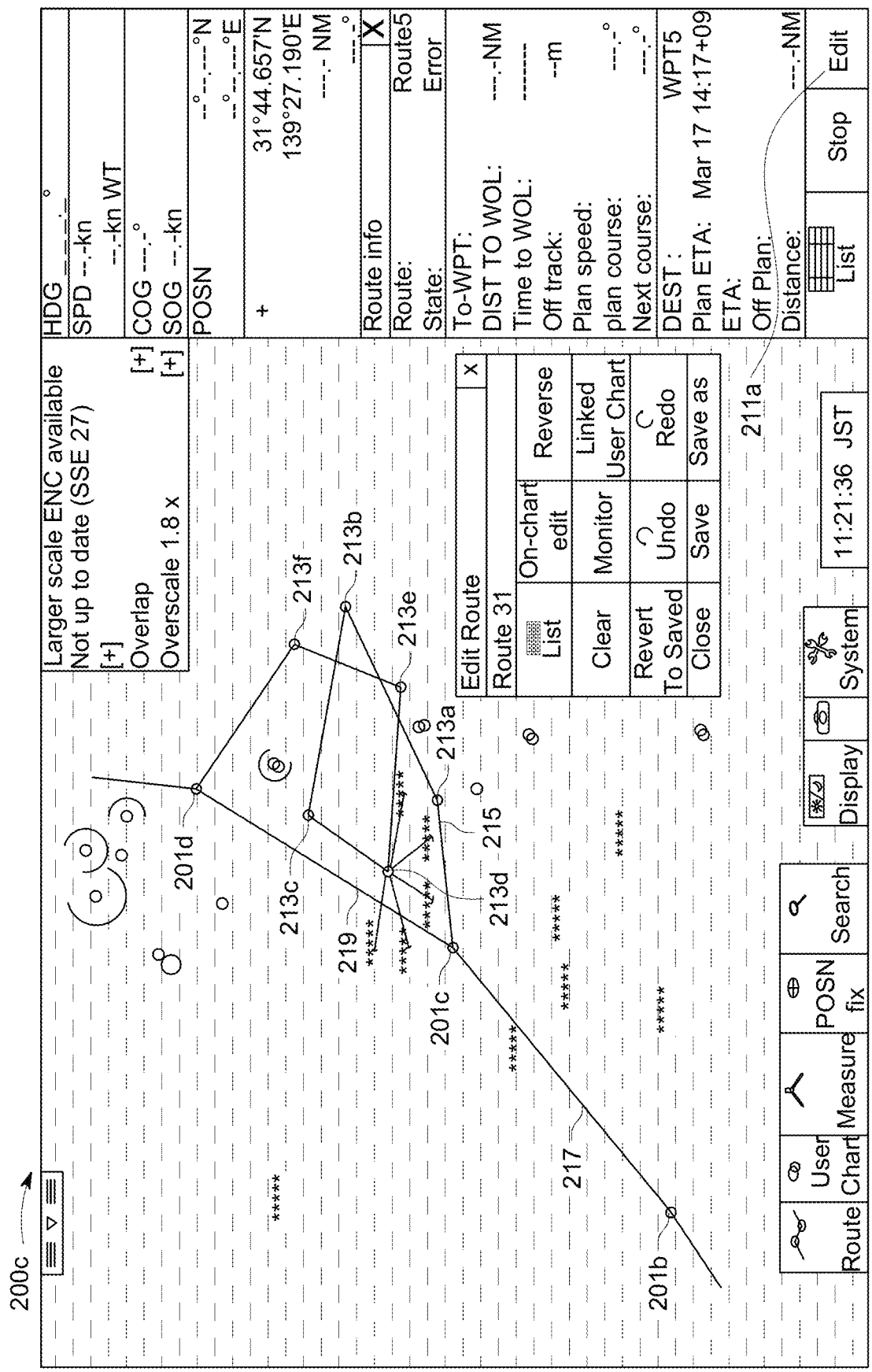
FIG. 2C illustrates a user interface for editing a route under monitoring when an obstacle is observed on the route under monitoring, in accordance with an example embodiment.

Therefore, the user 105 may input the different position data through the display 113 of the route editing assistance device 101, or through the user device 103. In both the cases, user interface shown to the user 105 to receive the different position data remains same. FIGS. 2A-2C below provides a detailed description of the user interface used to receive the different position data from the user 105 either through the display 113 or the user device 103.

FIG. 2A illustrates a user interface 200a to accept a first set of waypoints 201a, 201b, 201c, 201d, and 201e on a navigation chart 205, in accordance with an example embodiment. The user interface 200a shows the navigation chart 205. The user 105 may input each waypoint of the first set of waypoints 201a, 201b, 201c, 201d, and 201e by tapping at specific locations on the navigation chart 205, or by inputting latitude and longitude of each of the waypoints 201a, 201b, 201c, 201d, and 201e. In an embodiment, the first waypoint 201a and the last waypoint 201e are considered as the navigation start point and the navigation destination point, respectively. Alternatively, in some embodiments, the user 105 may first input the navigation start point 201a and the navigation destination point 201e, and further the user 105 may input the waypoints 201b-201d between the navigation start point 201a and the navigation destination point 201e to form the first set of waypoints 201a, 201b, 201c, 201d, and 201e.

The first set of waypoints 201a-201e defines a first route 203. According to an embodiment, the first route 203 can be edited by the user 105. As used herein, 'editing' refers to changing of the waypoints falling on the route to define a new path that may be followed by the moving object planned to travel on the first route 203. To that end, the first route 203 forms a route under monitoring which was originally planned by the user to travel. However, in some circumstances, the user may want to change the path defined by the route under monitoring. These circumstances may include detection of an obstacle on the first route 203, occurrence of a natural calamity, and user preference. The first route 203 can be edited while navigating on the first route 203 or before commencing the navigation on the first route 203. For example, while navigating on the first route 203, the user 105 may notice an obstacle in the first route 203. In such a case, the user 105 may edit the first route 203 to avoid collision with the obstacle. In another example, before commencing the navigation, the first route 203 may be edited as a part of route planning for the navigation.

FIG. 2B illustrates a user interface 200b for editing the first route 203, in accordance with an example embodiment. The user interface 200b includes an edit option 211a. The edit option 211a is an implementation of the edit action acceptance module 121. The user 105 may tap on the edit option 211a to edit the first route 203. In response to the tapping on the edit option 211a, the edit action acceptance module 121 creates a copy of the first route 203. Further, the user 105 may displace the position of the copy of the first route 203, on the display 113 displaying the navigation chart 205, by dragging and dropping the copy of the first route 203 to a new position on the navigation chart 205 to form a second route 209. The second route 209 is defined by the new position, i.e., waypoints of the second route are defined by locations of points lying at the new position. For example, the second route 209 is defined by a second set of waypoints 207a, 207b, and 207c lying at the new position. In other words, the copy of the first route 203 corresponds to the second route 209 upon displacing the position of the copy of the first route 203 by dragging the copy of the first route 203 to a desired location on the display 113, for defining the second route 209.

Alternatively, in some embodiments, the user 105 may edit the first route 203 by dragging points of the first route 203 to desired waypoints on the display 113. For example, the user 105 may drag the waypoint 201b to the waypoint 207a. Similarly, the user 105 may input the waypoints 207b and 207c. The waypoints 207a-207c may be referred to as the second set of waypoints. The second set of waypoints 207a-207c defines the second route 209. In some alternate embodiments, the user 105 may input the second set of waypoints 207a-207c by inputting the latitude and longitude of each waypoint of the second set of waypoints 207a-207c to form the second route 209.

Further, in some embodiments, while editing the first route 203, an edit window 211b may be displayed. The edit window 211b may include tools, such as 'list', 'on-chart edit', 'reverse', 'clear', 'monitor', 'linked user charts', 'revert to saved', 'undo', 'redo', 'close', 'save', 'save as' and the like, which may aid the user 105 to format and edit the first route 203. For example, the user 105 may tap on the 'linked user charts' to display all user charts linked with a monitored route (e.g., the first route 203). The user 105 may tap on the 'undo' tool to discard a last change applied to the first route 203 while editing the first route 203. Further, the user 105 may tap on the 'save' tool to save the second route 209.

Additionally or alternatively, according to some embodiments, a segment of the first route 203 can be edited. To that end, one or more waypoints of the first set of waypoints 201a-201e may be selected. A copy of the segment (i.e., the selected one or more waypoints) may be created as a route which can be further displaced on the navigation chart 205 to obtain a new route while displaying the first route 203. A detailed analysis of the selecting a segment of the first route 203 and obtaining a new route is described below with respect to FIG. 2C.

FIG. 2C illustrates a user interface 200c for editing the segment of first route 203, in accordance with an example embodiment. In FIG. 2C, a part of the first route 203 is shown for ease of explanation. The first route 203 may be segmented based on the first set of waypoints 201a-201d. For example, the first route 203 includes a segment 217 bounded by the waypoint 201b and the waypoint 201c, and a segment 219 bounded by the waypoint 201c and the waypoint 201d. The user 105 may tap on the edit option 211a to edit any segment of the first route 203. Further, the user 105 may select any segment for editing. For example, the user 105 may select the segment 219. In response to selecting the segment 219, the edit action acceptance module 121 creates a copy of the segment 219. Further, the user 105 may input waypoints 213a, 213b, 213c, 213d, 213e, and 213f for editing the segment 219. The waypoints 213a-213f may be referred to as the second set of waypoints. The waypoints 213a-213f define a second route 215 which may act as an alternate path corresponding to the segment 219.

Additionally, in some embodiments, the user 105 may drag and place the segment 219 at a desired position on the display 113 to form a new route (or a second route). To that end, the edit action acceptance module 121 is configured to generate a copy of the segment 219. The copy of the segment 219 is contemplated as a new route. The edit action acceptance module 121 is further configured to accept, from the user 105, a user input indicative of position displace information for displacing a position of the new route. The edit action acceptance module 121 is further configured to displace, based on the position displace information, position of the original/first route as defined by the segment 219 on the display 113 to form the new route, as defined by the second route 215. The waypoints of the new route, such as 213a-213f, are updated based on displacement of the position of the original route on the display 113.

In an embodiment, the display data generating module 123 is configured to generate the display data for simultaneously displaying the first route 203 and the second route 209. As shown in FIG. 2B, both the routes, i.e., the first route 203 and the second route 209 are displayed. Also, as shown in FIG. 2C, both the routes, i.e., the first route 203 and the second route 215 are displayed. As a result, the user 105 has access to original route (i.e., the first route 203) and edited route (the second route 215). Further, simultaneously displaying of both the routes allows the user 105 to compare the original route and the edited route. Furthermore, since the route editing can be initiated just by tapping the edit option 211a, only one user action is involved to start the route editing. Thereby, a time lag that existed in previous solutions known in the art before starting the route editing is minimized by the embodiments of the present disclosure. Additionally, the route editing assistance device 101 allows the user 105 to edit a route of any distance. In other words, the user 105 can edit a route without any limitation of the distance.

To that end, the user interface 200a may correspond to a user interface that may be displayed before editing of the first route 203, and the user interface 200b or the user interface 200c may correspond to a user interface that may be displayed while editing the first route 203.

According to an embodiment, the display data generating module 123 is further configured to hide one of the first route 203 or the second route 209 based on certain conditions.

Figure 3:
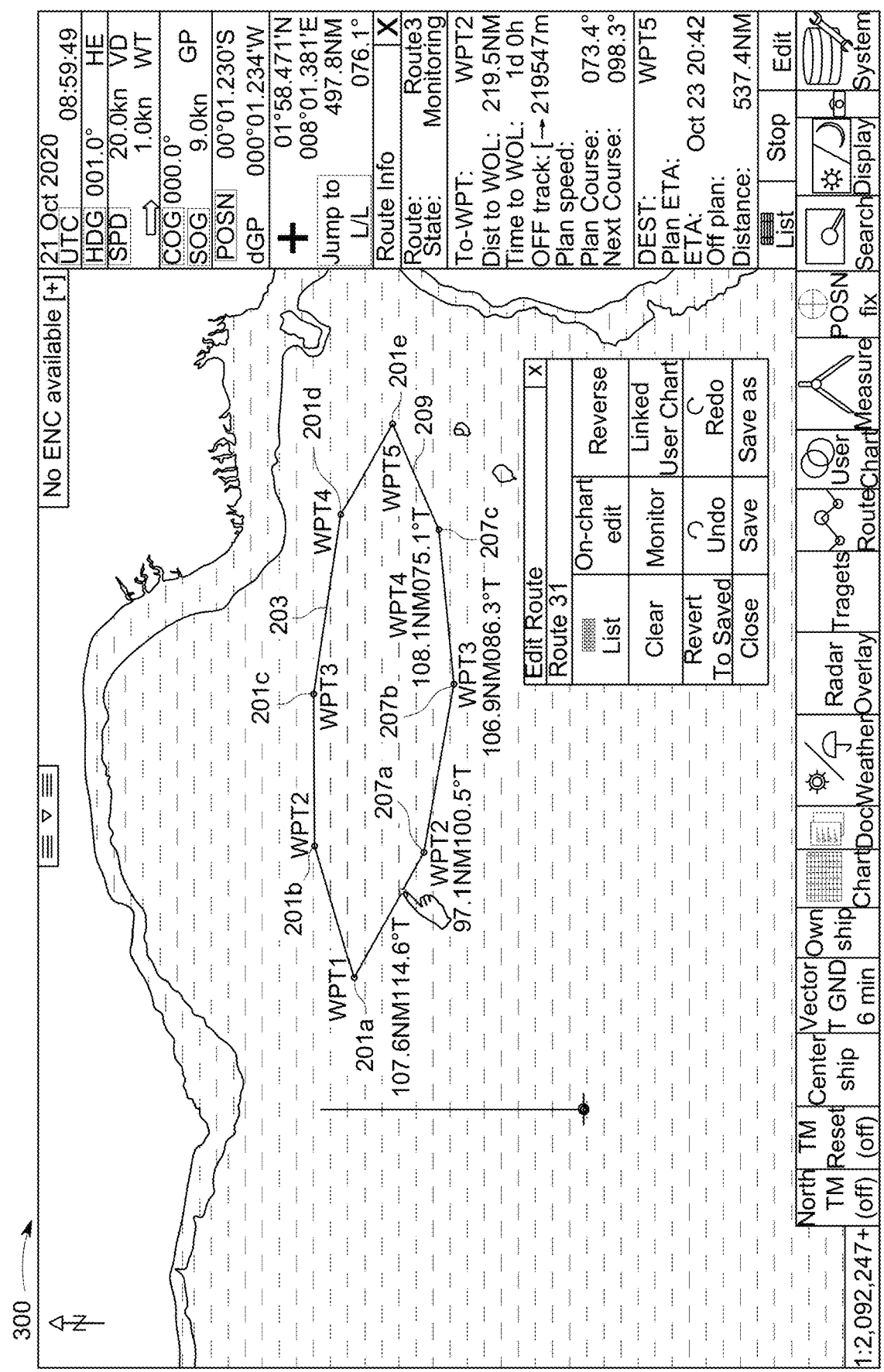
FIG. 3 illustrates a user interface, where one of the first route or a second route disappears based on one or more conditions, in accordance with an example embodiment.

FIG. 3 illustrates a user interface 300, where one of the first route 203 or the second route 209 disappears based on one or more conditions, in accordance with an example embodiment. The display data generating module 123 is further configured to control the display 113 to hide one of the first route 203 and the second route 209 based on a predetermined time. For instance, the display data generating module 123 may hide the first route 203 when the predetermined time is elapsed. In some embodiments, the user 105 may specify the predetermined time.

In an alternate embodiment, the display data generating module 123 is further configured to control the display 113 to hide one of the first route 203 and the second route 209 based on a user input indicative of selection of the one of the first route 203 or the second route 209. For example, the user 105 may select the second route 209 for the navigation. Subsequently, the first route 203 may be hidden by the display data generating module 123. In particular, the display data generating module 123 fades away the first route 203. According to an embodiment, the user interface 300 may correspond to a user interface that may be displayed after editing the first route 203.

The display data generating module 123 is further configured to generate conning information of the first route 203 and conning information of the second route 209 to be displayed on the display 113.

Figure 4:
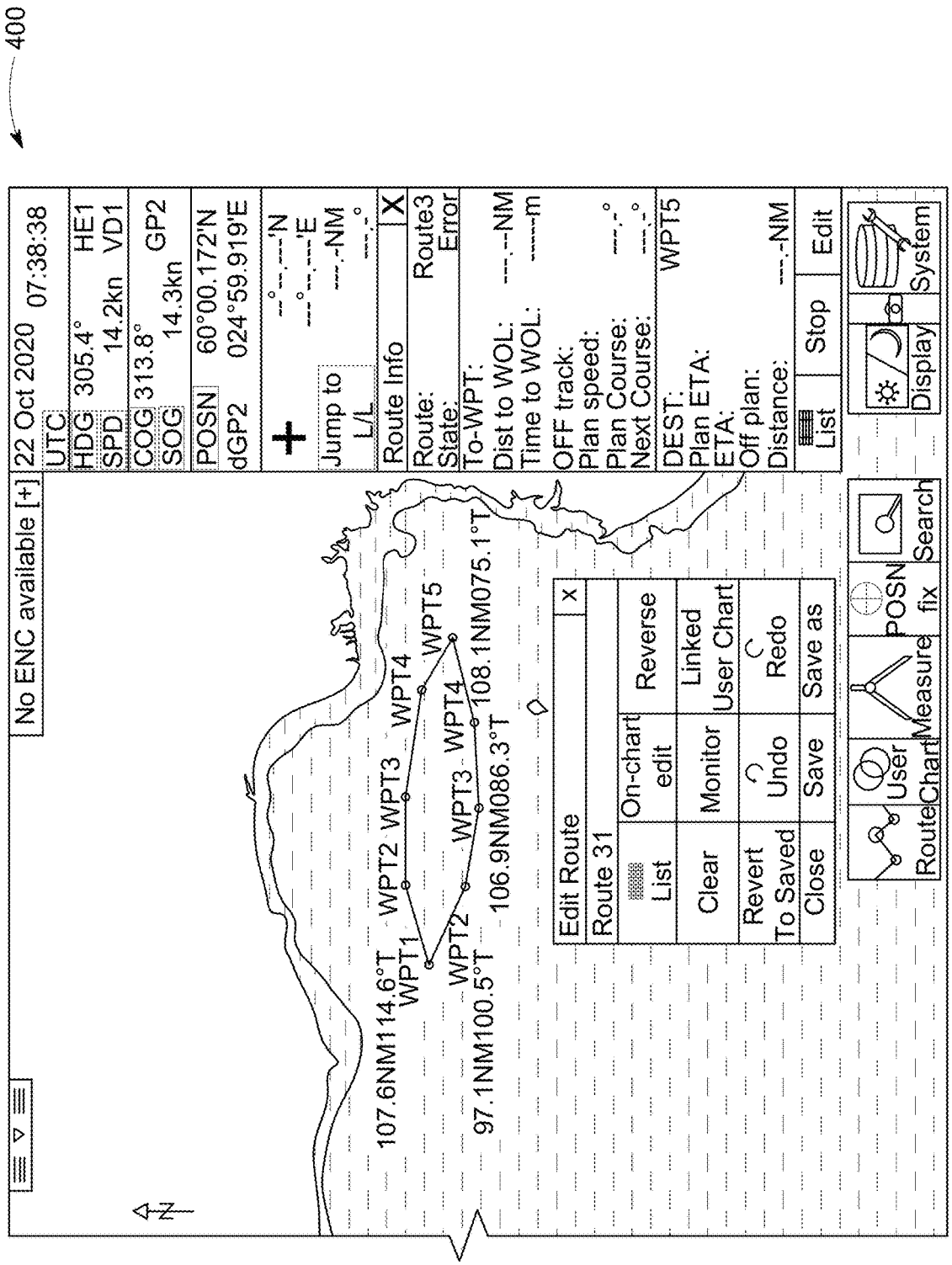
FIG. 4 illustrates a user interface displaying conning information of the first route and conning information of the second route, in accordance with an example embodiment.

FIG. 4 illustrates a user interface 400 displaying conning information 401 of the first route 203 and conning information 403 of the second route 209, in accordance with an example embodiment. The conning information 401 of the first route includes a first plurality of parameters 405 indicating navigation information of the first route 203. Specifically, the conning information 401 includes values of the first plurality of parameters 405 for each waypoint of the first set of waypoints 201a-201e.

The conning information 403 of the second route 209 includes a second plurality of parameters 407 indicating navigation information of the second route 209. Specifically, the conning information 403 includes values of the second plurality of parameters 407 for each waypoint of the second set of waypoints 207a-207c that defines the second route 209. The conning information 403 also includes values of the second plurality of parameters 407 for the navigation start point 201a and the navigation destination point 201e.

The first plurality of parameters 405 and the second plurality of parameters 407 include parameters such as position in latitude and longitude, turning radius, margin for channel limit, planned courses and steering methods (RL (Rhumb Line) and GC (Great Circle)), leg course, estimated time of arrival (ETA), maximum speed, minimum speed, time zone, and the like. In addition, in some embodiments, the first plurality of parameters 405 and the second plurality of parameters 407 may include total length of the first route 203 and the second route 209, respectively.

In an embodiment, the display data generating module 123 is further configured to generate route display data for simultaneously displaying, on the display 113, the first route 203, the conning information 401 of the first route 203, the second route 209, and the conning information 403 of the second route 209. The simultaneous display of both the routes with respective conning information allows the user to compare the both the routes based on the respective conning information, and select one of the first route 203 or the second route 209.

Additionally or alternatively, in some embodiments, the conning information 401 of the first route 203 includes a first set of alarm notifications and the conning information 403 of the second route 209 includes a second set of alarm notifications. Alarm notifications in the first set of alarm notifications and the second set of alarm notifications are sorted based on a predetermined sorting condition. In an embodiment, the predetermined sorting condition corresponds to an order from most important alarm notification to least important alarm notification. Alternatively, in some embodiments, the alarm notifications are sorted in the order from the most important and recently occurred issue. In other words, the alarm notification that latest and has higher importance is displayed preferentially.

According to some embodiments, the alarm notification includes alarm content text expressing the issue or risk (malfunction of a vessel component, vessel speed above safe limit, or the like, and an alarm icon graphically indicating importance of the alarm notification. Since the alarm icon graphically indicating the importance of the alarm notification is displayed with the alarm content text the user can, at a glance, identify the importance of each notification.

The display data generating module 123 is further configured to control the display 113 to display one of the conning information 401 of the first route 203 and the conning information 403 of the second route 209, when one of the first route 203 and the second route 209 is hidden. For example, when the first route 203 is hidden, subsequently the conning information 401 of the first route 203 fades away.

In some embodiments, the edit action acceptance module 121 is further configured to accept one or more user inputs, as user preferences, associated with at least one of the conning information 401 of the first route 203 and the conning information 403 of the second route 209. The one or more user inputs that are accepted as the user preferences may include the steering mode (rhumb line or great circle) to each waypoint, maximum speed of the vessel, minimum speed of the vessel, the margin for channel limit, and the like. The one or more user inputs that are accepted as the user preferences may also include latitude and longitude (i.e., position) of the waypoints. The edit action acceptance module 121 is further configured to modify, based on the user preferences, at least one of the first plurality of parameters 405 and the second plurality of parameters 407. To that end, the user 105 may modify the first plurality of parameters 405 and/or the second plurality of parameters 407, according to the user preferences.

Figure 5:
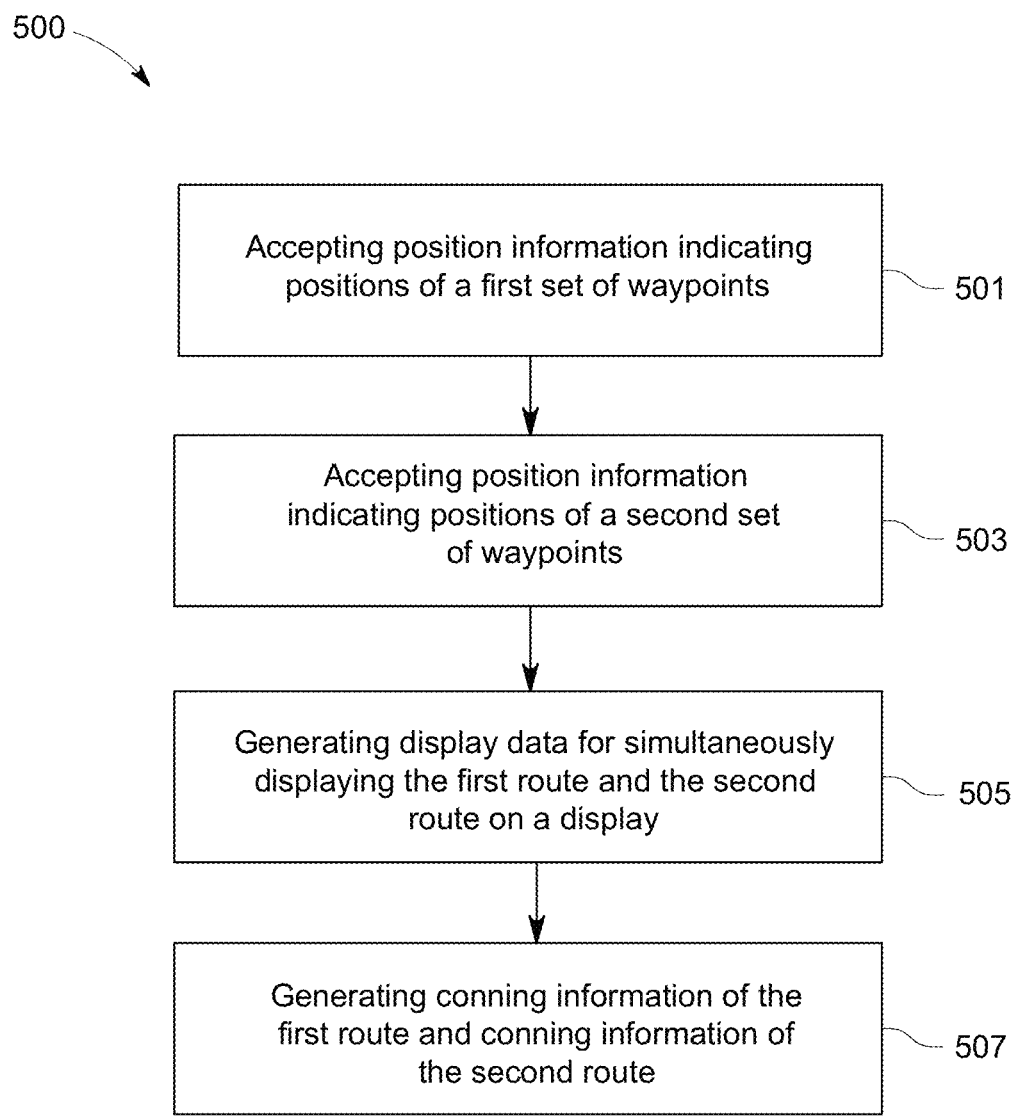
FIG. 5 is a flowchart that illustrates steps of a method executed by the route editing assistance device, in accordance with an example embodiment.

FIG. 5 is a flowchart that illustrates steps of a route editing assistance method 500 executed by the route editing assistance device 101, in accordance with an example embodiment. At step 501, the route editing assistance method 500 includes accepting position information indicating positions of the first set of waypoints 201a, 201b, 201c, 201d, and 201e. The first set of waypoints 201a, 201b, 201c, 201d, and 201e defines the first route 203.

At step 503, the route editing assistance method 500 includes accepting position information indicating positions of the second set of waypoints 207a, 207b, and 207c. The second set of waypoints 207a, 207b, and 207c defines the second route 209.

At step 505, the route editing assistance method 500 includes generating the display data for simultaneously displaying the first route 203 and the second route 209 on the display 113.

At step 507, the route editing assistance method 500 further includes generating conning information 401 of the first route 203 and conning information 403 of the second route 209. Additionally, the route editing assistance method 500 includes simultaneously displaying, on the display 113, the first route 203, the conning information 401 of the first route 203, the second route 209, and the conning information 403 of the second route 209. The conning information 401 of the first route 203 includes the first plurality of parameters 405 indicating navigation information of the first route 203, and the conning information 403 of the second route 209 includes the second plurality of parameters 407 indicating navigation information of the second route 209.

Example embodiments of the present disclosure may thus provide the route editing assistance device 101 and the route editing assistance method 500 that provide an efficient route editing operation for editing the first route 203 and simultaneously displaying the first route 203 and the second route 209.

Many modifications and other embodiments of the disclosures set forth herein will come to mind of one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiment disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, movable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A route editing assistance device for editing a first route, comprising:
   an input interface configured to accept position information indicating positions of a first set of waypoints representing the first route;
   processing circuitry configured to:
      accept position information indicating positions of a second set of waypoints, wherein the second set of waypoints defines a second route; and
      generate display data for simultaneously displaying the first route and the second route on a display, wherein the processing circuitry is further configured to generate conning information of the first route and conning information of the second route, wherein the conning information of the first route includes a first plurality of parameters indicating navigation information of the first route, and the conning information of the second route includes a second plurality of parameters indicating navigation information of the second route, and wherein the processing circuitry is configured to:
accept one or more user inputs, as user preferences, associated with display of at least one of the conning information of the first route and the conning information of the second route; and
modify, based on the user preferences, at least one of the first plurality of parameters and the second plurality of parameters.

2. The route editing assistance device of claim 1, wherein the processing circuitry is further configured to:
accept a first user input indicative of selection of a segment of the first route; and
generate a copy of the selected segment as the second route; and
accept a second user input indicative of position displace information for displacing a position of the segment of the first route to a new position to form the second route.

3. The route editing assistance device of claim 2,
wherein the processing circuitry is further configured to displace, based on the position displace information, position of the second route on the display, and
wherein the position information indicating positions of second set of waypoints of the second route is updated based on displacement of the position of the second route on the display.

4. The route editing assistance device of claim 1, wherein the processing circuitry is further configured to generate route display data for simultaneously displaying, on the display, the first route, the conning information of the first route, the second route, and the conning information of the second route.

5. The route editing assistance device of claim 1, wherein the processing circuitry is further configured to control the display to hide at least one of the first route and the second route based on a predetermined time.

6. The route editing assistance device of claim 1, wherein the processing circuitry is further configured to control the display to hide at least one of the first route and the second route based on a user input indicative of selection of one of the first route or the second route.

7. The route editing assistance device of claim 1, wherein the processing circuitry is further configured to control the display to display at least one of the conning information of the first route and the conning information of the second route, when at least one of the first route and the second route is selected and the other corresponding route is hidden.

8. The route editing assistance device of claim 1, wherein the conning information of the first route includes a first set of alarm notifications and the conning information of the second route includes a second set of alarm notifications.

9. The route editing assistance device of claim 8, wherein alarm notifications in the first set of alarm notifications and the second set of alarm notifications are sorted based on a predetermined sorting condition, and wherein the predetermined sorting condition corresponds to an order from most important alarm notification to least important alarm notification.

10. The route editing assistance device of claim 1, further comprising:
a memory configured to store a navigation chart including the first route, the conning information of the first route, the second route, and the conning information of the second route;
the display configured to display the navigation chart, and
at least one of a touch panel, and an Electronic Chart Display and Information System (ECDIS) configured to receive at least one of the position information indicating the positions of the first set of waypoints, the position information indicating the positions of the second set of waypoints, the position displace information, the first user input, the one or more user inputs, and the second user input.

11. A route editing assistance method for editing a first route using a route editing assistance device, comprising:
accepting, using processing circuitry of the route editing assistance device, position information indicating positions of a first set of waypoints representing the first route;
accepting, using the processing circuitry of the route editing assistance device, position information indicating positions of a second set of waypoints, wherein the second set of waypoints defines a second route;
generating, using the processing circuitry of the route editing assistance device, display data for simultaneously displaying the first route and the second route on a display; and
generating, using the processing circuitry of the route editing assistance device, conning information of the first route and conning information of the second route,
wherein the conning information of the first route includes a first plurality of parameters indicating navigation information of the first route, and the conning information of the second route includes a second plurality of parameters indicating navigation information of the second route, and
wherein the method further comprises, using the processing circuitry of the route editing assistance device:
accepting one or more user inputs, as user preferences, associated with display of at least one of the conning information of the first route and the conning information of the second route; and
modifying, based on the user preferences, at least one of the first plurality of parameters and the second plurality of parameters.

12. A route editing assistance device for editing a first route, comprising:
an input interface configured to accept position information indicating positions of a first set of waypoints representing the first route;
processing circuitry configured to:
accept position information indicating positions of a second set of waypoints, wherein the second set of waypoints defines a second route; and
generate display data for simultaneously displaying the first route and the second route on a display,
wherein the processing circuitry is further configured to generate conning information of the first route and conning information of the second route,
wherein the conning information of the first route includes a first set of alarm notifications and the conning information of the second route includes a second set of alarm notifications, and
wherein alarm notifications in the first set of alarm notifications and the second set of alarm notifications are sorted based on a predetermined sorting condition, and wherein the predetermined sorting condition corresponds to an order from most important alarm notification to least important alarm notification.

* * * * *